(12) United States Patent
Doutre

(10) Patent No.: US 8,249,744 B2
(45) Date of Patent: Aug. 21, 2012

(54) MAIL ROUTING SYSTEM INCLUDING A DATA BLOCK ANALYZER

(75) Inventor: Mark R Doutre, Portsmouth (GB)

(73) Assignee: Lockheed Martin UK Limited, Havant, Hampshire (GB)

( * ) Notice: Subject to any disclaimer, the term of this patent is extended or adjusted under 35 U.S.C. 154(b) by 538 days.

(21) Appl. No.: 12/319,716

(22) Filed: Jan. 10, 2009

(65) Prior Publication Data

US 2009/0271029 A1    Oct. 29, 2009

(30) Foreign Application Priority Data

Jan. 11, 2008 (GB) .................................. 0800492.1

(51) Int. Cl.
*G06F 7/00* (2006.01)
*G06K 9/00* (2006.01)

(52) U.S. Cl. ........ 700/224; 700/225; 700/226; 700/227; 700/228; 209/583; 209/584; 209/900; 209/3.3

(58) Field of Classification Search .......................... None
See application file for complete search history.

(56) References Cited

U.S. PATENT DOCUMENTS

| | | | |
|---|---|---|---|
| 6,269,171 B1 | 7/2001 | Gozzo et al. | |
| 6,610,955 B2 * | 8/2003 | Lopez | ............................ 209/584 |
| 7,219,095 B1 | 5/2007 | Bezuijen et al. | |
| 7,834,289 B2 * | 11/2010 | Orbke et al. | .................... 209/584 |
| 2001/0054031 A1 | 12/2001 | Lee et al. | |
| 2005/0137991 A1 | 6/2005 | Bruce et al. | |

FOREIGN PATENT DOCUMENTS

WO    0102104 A    1/2001

OTHER PUBLICATIONS

Shafer, J. et al., "How Postal Address Readers are Made Adaptive," [Lecture Notes in Computer Science; LNCS], Apr. 2, 2004, pp. 187-215, Springer-Verlag, Berlin/Heidelberg.

* cited by examiner

*Primary Examiner* — Gene Crawford
*Assistant Examiner* — Yolanda Jones
(74) *Attorney, Agent, or Firm* — Louis J. Franco; Law Office of Louis J. Franco

(57) ABSTRACT

A method is provided for routing mail items in a mail sorting system that includes means for capturing address information from a mail item in the form of an address block and an analysis engine comprising a plurality of analysis modules. The method comprises: receiving the address block at the analysis engine and making available to each of a set of the analysis modules at least a portion of the address block; at each analysis module, decomposing the available portions of the address block into one or more data objects, each including a representation component representing at least part of the portion and a data type identifier; storing the data objects with an indication of the mail item to which the objects relate; and subsequent to identifying a delivery endpoint for the mail item, adding at least one of the stored data objects to a data set associated with that delivery endpoint whereby future mail items may be routed to that delivery endpoint in dependence on those data objects.

24 Claims, 1 Drawing Sheet

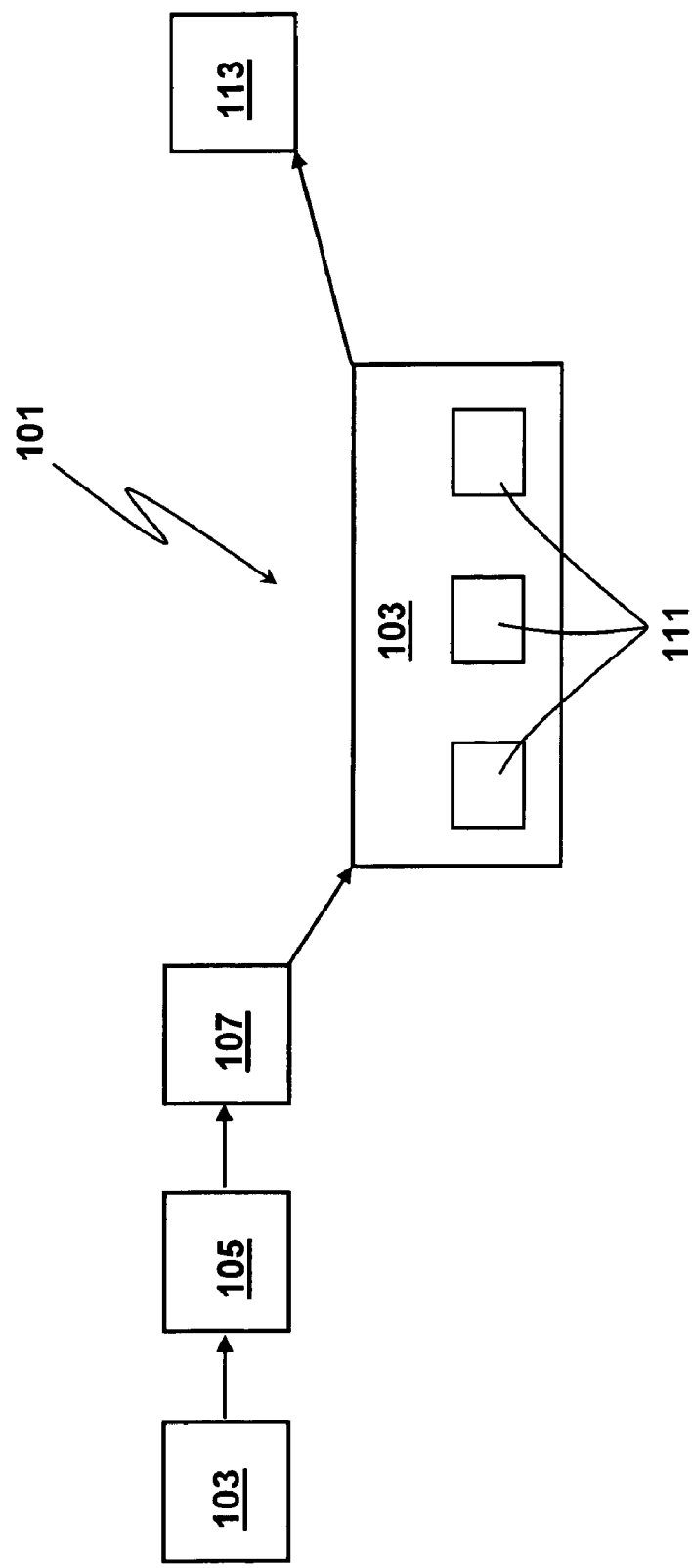

MAIL ROUTING SYSTEM INCLUDING A DATA BLOCK ANALYZER

FOREIGN PRIORTY CLAIM

Priority based on British Patent Application Serial No. GB0800492.1 filed Jan. 11, 2008, and entitled "BLOCK ANALYZER" is claimed. The entirety of the disclosure of the previous foreign application, including the drawings and claims, is incorporated herein by reference as if set forth fully in the present application.

BACKGROUND

The present invention relates to a block analysis engine for processing blocks of text data, and particularly to a modular analysis engine for a mail sorting system.

Every day, millions of items of mail pass through national and international mail systems. If the mail items are to successfully pass from their point of posting to their intended destination, each mail item must be individually sorted and directed in dependence on the address indicated on the mail item. Conventional mail sorting systems rely on a combination of machine sorting and sorting by hand.

Machine sorting is much faster than sorting by hand and allows a sorting office to handle large volumes of mail more efficiently. Machine sorting is therefore generally preferable to sorting by hand. However, in certain situations, hand sorting by sorting office employees is required with conventional systems. One such situation occurs when address information on a mail item cannot be understood by a sorting machine.

In conventional sorting systems, errors and omissions in the address information of a mail item can prevent a sorting machine from correlating a mail item with the correct delivery point. Problems with address information can include: mis-spelled words, use of a non-standard address form, changes of company name, changes of surname, and new building names or building divisions. Because of the increased speed of machine sorting, it is advantageous if the sorting system can adapt to these problems so that a greater proportion of mail items can be correctly correlated with their intended delivery point.

U.S. Pat. No. 6,954,729 (hereinafter, the '729 patent) describes an address learning system embodying a computerized method for correlating unmatched and/or unused text strings from a mail item according to a set of predetermined rules so as to allow the correct delivery of future mail items carrying those unmatched and/or unused text strings on the basis of those text strings. In other words, the system "learns" the delivery point which is indicated by the previously unrecognized text strings.

The '729 patent describes a conventional learning system in which address data is captured as a text string from a mail item and compared with data in an address database in order to determine a match with the captured address data and correctly route the item. Unmatched or unused address data of a mail item which is correctly routed to its destination is stored as a learning candidate for later correlation with that destination, should the data prove to be suitable for promotion into the address database. If a match is not found in the address database for a subsequent item of post, this system allows unmatched or unused address data which has been promoted into the address database to be used to correctly route the item.

A problem with the system is that the number of stored learning candidates grows rapidly as mail passes through the system, and continues to grow as further candidates are added. In order for a learning candidate to be promoted into the address database, the system searches the learning candidates for candidates which reinforce one another and indicate that the unmatched/unused address data is a reliable indicator of the destination address. Since the stored learning candidates are a set of text strings growing continuously in number the search process is highly intensive and requires that a particular learning candidate is compared against all other learning candidates of its type. The processing time required to perform a search for a match for a particular learning candidate grows factorially with the number of stored learning candidates.

Conventional mail sorting systems either do not allow the routing of mail items with addresses which do not match the addresses stored in the routing database, or the systems have some ability to learn the delivery point associated with unmatched addresses but that ability does not scale well with the number of mail items passing through the system. Furthermore, the matching operations performed by conventional mail sorting systems are limited to the comparison of address text strings.

Accordingly, there is a need for a scalable mail sorting system operable to analyze the address information captured from mail items and provide data in a form suitable for further processing, including routing mail items in dependence on the data.

SUMMARY

According to a first aspect of the present invention, there is provided a method for routing mail items in a mail sorting system that includes means for capturing address information from a mail item in the form of an address block and an analysis engine comprising a plurality of analysis modules, the method comprising: receiving the address block at the analysis engine and making available to each of a set of the analysis modules at least a portion of the address block; at each analysis module, decomposing the available portions of the address block into one or more data objects, each including a representation component representing at least part of the portion and a data type identifier; storing the data objects with an indication of the mail item to which the objects relate; and subsequent to identifying a delivery endpoint for the mail item, adding at least one of the stored data objects to a data set associated with that delivery endpoint whereby future mail items may be routed to that delivery endpoint in dependence on those data objects.

Preferably, the method further comprises the step of selecting for addition to the data set associated with the said delivery endpoint one or more of the stored data objects that have a representation component that does not match any part of the data set associated with the delivery endpoint.

In the said step of selecting, a representation component may be determined not to match any part of the data set associated with the delivery endpoint if a textual comparison of the representation component with the address stored in the said data set yields no match. In the said step of selecting, a representation component may be determined not to match any part of the data set associated with the delivery endpoint if a phonetic comparison of the representation component with the address yields no match.

The method may further comprise the step of selecting the portions of the address block to be made available to a particular analysis module in dependence on the data types of the one or more data objects which that analysis module is configured to provide.

The step of identifying a delivery endpoint for the mail item may comprise manually determining a delivery endpoint indicated by the address block for the mail item. The step of identifying a delivery endpoint for the mail item may comprise passing the mail item to an automated system arranged to determine the delivery endpoint of mail items it receives.

Preferably the step of adding at least some of the stored data objects to the data set associated with the delivery endpoint comprises writing the at least some of the stored data objects to a routing database and linking the data objects to the delivery endpoint.

The method may further comprise the step of including in at least some of the data objects a value indicating a measure of the confidence with which the representation component of the data object belongs to the indicated data type. The method may further comprise the step of selecting the at least some of the stored data objects for addition to the data set associated with the delivery endpoint in dependence on the confidence values of the stored data objects.

The method may further comprise the step of selecting a stored data object for addition to the data set associated with the delivery endpoint in dependence on the degree of correlation between the representation component of the data object and at least part of the address stored in the said data set. The degree of correlation may be judged on the basis of textual or phonetic similarity of one or more words of the representation component of the data object and the address stored in the said data set.

Preferably, the method further comprises the step of selecting a stored data object for addition to the data set associated with the delivery endpoint in dependence on the repeated occurrence of the representation component of the data object in the captured address blocks of one or more mail items which share said delivery endpoint, wherein the representation component does not occur in the address stored in the said data set.

Preferably, the method further comprises, subsequent to the step of decomposing the available portion of the address block into one or more data objects at an analysis module, the steps of: making available at least some of the one or more data objects for processing at one or more further analysis modules of the analysis engine; at each further analysis module, generating one or more further data objects, each including a representation component representing at least part of an available data object and a data type identifier; and storing the further data objects with the said data objects with an indication of the mail item to which the objects relate.

One or more of the further analysis modules may perform phonetic analysis of the said data objects.

The data type identifier of a data object may indicate that the representation component of that data object is one of a textual representation, a phonetic representation, a binary representation, and a representation of location.

The data type identifier of a data object may indicate that the representation component of that data object is one or more of: a title, a first name, a surname, a house number, a house or building name, an address line, a locality, a city or town, a county, a country, and a postcode.

Suitably, the representation component of a data object includes one or more data elements. Each data element may represent one or more of: a title, a first name, a surname, a house number, a house or building name, an address line, a locality, a city or town, a county, a country, and a postcode.

According to a second aspect of the present invention, there is provided a method for routing mail items in a mail sorting system that includes means for capturing address information from a mail item in the form of an address block and an analysis engine comprising a plurality of analysis modules, the method comprising: receiving the address block at the analysis engine and making available to each of a set of the analysis modules at least a portion of the address block; at a first set of analysis modules, decomposing the available portions of the address block into a first set of data objects, each including a text representation component representing of at least part of the portion and a data type identifier; at a second set of analysis modules, performing phonetic processing on one or more of the first set of data objects so as to produce a second set of data objects, each including a phonetic representation component of the text of the respective first data object and a data type identifier; subsequent to identifying a delivery endpoint for the mail item, comparing the phonetic representations of one or more second data objects with the phonetic representations of one or more parts of the address stored in a data set associated with the delivery endpoint; and adding to the data set those second data objects whose phonetic representations at least approximately match the phonetic representations of the one or more parts of the address stored in the said data set, whereby future mail items may be routed to that delivery endpoint in dependence on those data objects.

Preferably, the method further comprises the step of selecting for addition to the data set associated with the said delivery endpoint those second data objects having a representation component which on a textual comparison does not match any part of the address stored in the said data set.

Suitably, each phonetic representation is a numeric or alphanumeric code generated by a phonetic analysis module in dependence on the text representation component of the respective first data object.

Preferably, the comparing step includes comparing one or more alternative phonetic representations linked to the phonetic representations of a respective second data object with the phonetic representations of the one or more parts of the address stored in the said data set.

According to a third aspect of the present invention, there is provided a mail sorting system for automatically routing mail items comprising: means for capturing address information from a mail item in the form of an address block; an analysis engine comprising a plurality of analysis modules: the analysis engine being arranged to receive a captured address block and make at least a portion of the address block available to each of a set of the analysis modules; each of the set of analysis modules being configured to decompose the available portion of the address block into one or more data objects, each including a representation component representing at least part of the portion and a data type identifier; a data store arranged to store the data objects in a database with an indication of the mail item to which the objects relate; means for receiving at the mail sorting system an indication of the delivery endpoint for the mail item; and means for adding at least some of the stored data objects to a data set associated with the delivery endpoint, whereby future mail items may be routed to that delivery endpoint in dependence on those stored data objects.

BRIEF DESCRIPTION OF THE DRAWINGS

One or more illustrative embodiments of the present invention will now be described by way of example with reference to the accompanying drawings, in which:

FIG. 1 is a schematic diagram of a mail sorting system in accordance with the present invention.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

A mail sorting system 101 in accordance with the present invention is shown in FIG. 1. At least one data capture component 103 extracts address information from a mail item (not shown). Preferably, a data capture component 103 uses optical character recognition (OCR) to convert a handwritten or printed address into text information. Any suitable data capture means could be used, such as optical scanning, photography or other methods of detecting imprinted address information. OCR could be performed on scanned images or digital photographs of mail items. If OCR is not successful, the address information from a mail item could be entered manually. One or more data capture components 103 could read other information encoded onto the mail item, such as barcode data indicating the delivery address, postage paid or the type of delivery service requested.

The address information from a data capture component 103 may be in any one of a number of formats. If the address information is not in the data format required by pre-processing component 107, a normalizing component 105 may be used to convert the output from the one or more data capture components 103 into the format expected by the pre-processing module. The normalizing component may support a different normalizing module for each data capture component. Alternatively, the functions of the normalizing component 105 could be integral to the data capture component(s) 103. Preferably, the normalization component 105 aggregates the outputs from the one or more data capture components 103 into a single normalized data stream.

The normalizing component 105 provides the address information as a data block containing the captured address text in a predetermined format. Preferably, an indication of the data class or type is provided with the data block. Timestamp information and information indicating which data capture component 103 the address text originated from may also be provided. Preferably, the address data block is an xml data object of a predefined data class.

In the case of a mail item, the data block is an address data block and the data class could be expressed as address_data. Further data blocks having different data classes could include return address, postage/delivery service information and mail item size and weight. Preferably, the data blocks relating to a particular mail item are associated with an identifier (such as a unique mail item number which could be allocated automatically to the mail item) which indicates the mail item to which the data blocks relate.

Pre-processing component 107 receives the normalized data blocks from normalizing component 105 (if present). The data blocks may be received by any means, including: over a network, by means of data transfer at a data processing system, and as a result of software calls at a data processing system. The pre-processing component stores the received data blocks, preferably in a database.

Analysis engine 109 accepts data blocks from the pre-processing component 105. The analysis engine 109 comprises one or more analysis modules 111, each configured to perform a particular analysis on at least some of the data blocks received at the analysis engine and provide one or more data objects as outputs. Preferably, the data objects are xml data objects and each data object may include one or more xml data elements. Each data object includes a representation component and a data type identifier. For example, a phonetic analysis module might output data objects having a data type identifier type_phonetic and a representation component which is a phonetic representation of at least part of a received data block according to a predetermined phonetic algorithm.

A text analysis module might output data objects having a data type identifier type_text and a representation component which is a textual representation of at least part of a received data block. One or more text analysis modules are preferably used to decompose a captured address block into one or more data objects each having one or more data elements representing the address information, as described below.

The pre-processing component or analysis engine 109 preferably determines which module or set of modules of analysis engine 109 to use to process each data block. On receiving a data block at the analysis engine 109, an agent of the analysis engine 109 preferably selects one or more modules 111 of the analysis engine to process a given data block. This determination could be performed on the basis of, for example, the data class to which the data block belongs, or which data capture component the data originated from. Thus address data blocks would be passed to a predetermined set of analysis modules 111. The analysis engine 109 could select one or more analysis modules 111 to process a given data block in dependence on the types of data object output by the analysis modules 111.

In a preferred embodiment, the address blocks captured from all mail items are passed to the analysis engine 109 so as to build up a comprehensive data set of data objects on the basis of which mail items may be routed.

It is advantageous if each analysis module 111 is self-contained and independent of the other modules 111 such that modules 111 may be added, removed or replaced without requiring significant changes to the system. Suitably, each module 111 could register which classes of data block it can process and/or the data types of the data objects it can provide with the pre-processing component 107 or agent of the analysis engine. This is beneficial since a module 111 then only receives data blocks of a class which it is capable of processing. Alternatively, a stream of data blocks are passed to the analysis engine 109 and each module 111 only picks up and processes those data blocks which it is capable of processing.

Note that an analysis module 111 may be an analysis engine in its own right, and might include functionalities which extend beyond those required in its role as an analysis module 111. It is only necessary that a module 111 is an entity configured to receive data blocks or elements of a data block from the pre-processing component 107 or other modules or agents of the analysis engine, and output the results of its analysis as one or more data objects or data elements of an xml object.

Each analysis module 111 processes the data blocks or objects it receives in accordance with a set of predetermined algorithms. The present invention does not constrain the type of analysis that may be performed at a module 111, and the one or more data objects or elements it provides as an output may therefore contain any kind of data and may be of a data type defined by the module 111. The data objects are associated with an identifier which indicates the mail item that the data elements relate to. Preferably the identifier is the mail item number.

Once a module 111 has analyzed a data block it may make its output available to other modules 111. The modules 111 of the analysis engine 109 or the analysis engine 109 itself could be configured such that the output of a first module 111 is piped into the input of a second module 111. Alternatively, the selection of one or more further modules 111 may be performed in dependence on the output of one or more first modules 111. For example, if an analysis performed at a first module 111 was unsuccessful or returned one or more data objects with a low confidence rating (see below), the analysis engine 109 or one of the modules 111 could be arranged to select a further module 111 for processing the data block or the data objects provided by the first module 111.

It is advantageous if a data block is first processed at one or more analysis modules 111 configured to decompose the data block into a set of data objects (xml objects or elements) which may then be individually processed at further analysis modules 111. This allows the particular components of a data block to be extracted for specific analysis in the most appropriate manner. For example, an address may be decomposed into its constituent components which might include: addressee (title, first name(s), surname), house/building number, street address, locality, city or town, county, country and post code. The post code could then be analyzed in a different manner (and potentially at a different analysis module 111) to the addressee.

As an example, consider the mail sorting system illustrated in FIG. 1 and an address data block which has been captured from a mail item and normalized. The data block might be:
Mr JOHN SMYTHE
NEW HOUSE
17 HIGH STREET
SMALLTOWN
COUNTYSHIRE
CO11 8SE In this example, one or more analysis modules 111 of the mail sorting system decompose this data block into the following xml elements, which together form an xml address object:

```
<name>
    <title>Mr</title>
    <forename>JOHN</forename>
    <surname>SMYTHE</surname>
</name>
<buildingname>NEW HOUSE</buildingname>
<street>
    <streetnumber>17<streetnumber>
    <streetname>HIGH</streetname>
    <designator>STREET</designator>
</street>
etc.
```

As is known in the art, the elements of the address may be inferred from one or more of: the position of a text string in the address block; the form of a line of the address; and the presence of keywords in the address. Once decomposed, the data elements can be passed on to other analysis modules 111 for further processing.

A line or portion of the address may be represented by more than one data element. This can occur if the line or portion of the address may be decomposed in more than one way. For example, the text string "Cornwall" could indicate the UK county or a town in New York state, USA. It is therefore advantageous if an analysis module 111 can provide a value associated with an xml element that is indicative of the confidence that the output of the module 111 is accurate. In the case of an analysis module 111 configured to parse an address data block for street names, if the module 111 finds any candidates it outputs each one in an xml object of a type "street_name" along with a confidence rating that the candidate street name is indeed a street name.

In a preferred embodiment of the present invention, an analysis module 111 performs phonetic analysis on a data element or on predetermined parts of a data block and provides a phonetic definition of the element or at least part of the text of the data block as its output. This allows the mail sorting system to decompose an address block into its component parts with improved accuracy and allows mis-spellings or alternative transliterations of nouns to be matched with the stored or assumed spelling. A phonetic analysis module 111 could use published phonetic analysis algorithms such as Soundex, Metaphone or Double Metaphone, by way of non-limiting example.

For example, a text-processing module 111 operating on address data containing the mis-spelling "Shevorn" might return a "first_name" xml object with a low confidence rating, but a phonetic representation of the name returned by a phonetic analysis module 111 and compared against a database of phonetic definitions of first names would return the correct spelling "Siobhan" with a high confidence rating.

A phonetic analysis module 111 may have access to a database linking alternative phonetic representations of nouns such that all the alternatives could be provided by the module 111. For example, the first name Edward could be written Ted, Teddie, Teddy, or Eddy—all of which might be used by different parties to refer to the same addressee.

A further advantage of using phonetic analysis is that it allows the phonetic comparison of text strings. The phonetic definition of a text string from an address block provided by a module 111 performing phonetic analysis may be compared with a database (not shown) of phonetic definitions in order to allow variations in spelling of names and places to be accommodated. For example: EDWARD : EDWARDO: EDWOOD could all return a phonetic definition of 23465 using the Soundex algorithm. If the text string EDWUD were to be passed to a phonetic analysis module 111, the module 111 would also return a phonetic definition of 23465 and would therefore indicate a potential match with the correctly-spelled names Edward, Edwardo or Edwood. Embodiments of the present invention incorporating a phonetic analysis module 111 and database (not shown) would therefore allow the misspelling of EDWARD to return a match with the correct spelling. The phonetic database could also store links between certain phonetic definitions. For example: ED : TED produce a value of 78321, while EDDY: EDDIE: TEDDY: TEDDIE produce a value of 99112. The database might therefore store links between the phonetic definitions [23465:78321:99112]. If a phonetic analysis module 111 returns one of these values, one could infer that the address text string has a potential match with the other values in the set.

The outputs of the analysis modules 111 may be collated by the analysis engine 109 and provided at the output of the analysis engine 109 as one or more data objects. Each object contains a set of data elements which represent the results of the various analyses performed by one or more analysis modules. The data objects are passed to the post-processing component 113 which stores the data objects in a database.

Since each data object carries, or is associated with an identifier (preferably the mail item number), which ties the data object to its parent mail item, a data object can be connected with the final delivery point of its parent mail item. In embodiments of the present invention, mail items whose captured address block does not find a match in the routing databases must be routed (if at all possible) by means of a secondary routing mechanism. Secondary routing mechanisms include manual routing, an automated routing system with improved optical capture and character recognition capabilities as compared to the primary routing mechanism, or a system combining manual and machine-based routing such as manual address recognition of address information captured by a machine. Hand sorting of mail items is successful in the vast majority of cases.

Following the delivery endpoint of a mail item being identified, one or more data objects or data elements of a data object that are generated at the analysis engine in respect of that mail item are associated with the identified delivery endpoint. This association is preferably effected by writing the one or more data objects or data elements (possibly as a new data object) to a routing database and linking the data objects to the identified delivery endpoint. Those data objects or data elements are then considered to form part of the data set that is held for that delivery endpoint.

It is advantageous if data objects or elements are selected at post-processing component 113 for storage in a routing database so as to allow future mail items to be routed to their delivery endpoint in dependence on the selected data objects. Data objects may be selected in dependence on the confidence values of the data objects stored at the post-processing component 113. For example, data objects/elements having a high confidence value may be associated with the delivery endpoint. Data objects may be selected in dependence on the degree of correlation between the representation component of a data object and at least part of the address representing the delivery endpoint. The degree of correlation may be judged on the basis of textual or phonetic similarity.

It is advantageous if those data objects which contain a representation component which is not present in the address of the identified delivery endpoint are associated with the routing endpoint so as to allow the routing of future mail items in dependence on those data objects. This allows mail items to be in future routed on the basis of address information which does not form part of a standard address representing the endpoint, and allows the addressee information at a particular address to be updated or extended (for example, to reflect name changes, new occupants etc.). The comparison between the representation component and the address may be performed on a textual or phonetic basis.

Data objects/elements may be associated with a delivery endpoint that have a representation component which repeatedly occurs in the address blocks of mail items which have a common delivery endpoint but which do not themselves occur in the address of the delivery endpoint stored in the routing databases. One or more mechanisms for selecting data objects or elements for association with a delivery endpoint may be combined. To give a particular example, consider the following address provided on a mail item:
Ted
10 High Street
South Bank
London
The address was insufficient for automatic routing since there are several High Streets in London and the mail item was therefore routed by hand to its delivery endpoint using the knowledge that "South Bank" is sometimes used to refer to an area of Southwark in London. The endpoint address is identified as:
Mr Edward Smith
10 High Street
London
SE1 7HL
Upon manual routing of the mail item the mail item number is bound to the identified delivery endpoint. Decomposition of the captured address block at the analysis engine 109 yields (amongst other elements) the data element "South Bank". At the post-processing component 113, because the data element "South Bank" occurs in more than a predetermined number of stored data objects relating to a plurality of mail items which have the same or similar delivery endpoints, the data element is associated with those delivery endpoints in the manner described above.

Once a data block has been captured and analyzed at the analysis engine 109, the resulting data objects could be further processed in any number of ways. The data objects which do not become associated with a particular endpoint may also be retained for later processing. The data objects relating to each delivery endpoint can provide useful information which could be used in various marketing, monitoring and tracking activities. For example, the data objects could be processed to identify when a surname changes through marriage, when the occupancy of a building changes, or when a house is broken up into two or more flats. One or more of these events could be identified by further processing of the data sets generated by a system operating in accordance with the present invention so as to allow targeted marketing to the occupants at a particular address.

FIG. 1 is a schematic diagram showing the components of a mail sorting system configured in accordance with the present invention. Each component does not necessarily map onto a software or hardware entity dedicated to performing the described functions. In a practical implementation of the present invention, the components illustrated in FIG. 1 may not be distinct entities and functions of adjacent components may be combined. Moreover, the components illustrated in FIG. 1 need not be co-located and could be geographically remote from one another and connected by means of a network. Furthermore, one or more modules 111 of the analysis engine 109 could be geographically remote from one or more of the other modules 111.

The terms data object and data element are used herein to refer to the output of one or more analysis modules 111. Data elements are envisaged as forming a component of an xml data object. However, the term "data object" may refer to either an xml object having a defined data type or an xml element of a defined xml tag type.

It will be readily understood that the present invention may be applied in the analysis of a wide variety of text sources. For example, a system operating in accordance with the present invention could receive and analyze text data from emails, instant messaging conversations or telephone transcripts so as to produce a categorized data set which might include: address data objects, telephone data objects, name data objects, and keyword data objects.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description, it will be evident to a person skilled in the art that various modifications may be made within the scope of the invention.

What is claimed is:

1. A method for routing mail items in a mail sorting system that includes means for capturing address information from a mail item in the form of an address block and an analysis engine comprising a plurality of analysis modules, the method comprising:

receiving the address block at the analysis engine and making available to each of a set of the analysis modules at least a portion of the address block;

at each analysis module, decomposing the available portions of the address block into one or more data objects, each including a representation component representing at least part of the portion and a data type identifier;

storing the data objects with an indication of the mail item to which the objects relate; and subsequent to identifying a delivery endpoint for the mail item, adding at least one of the stored data objects to a data set associated with that delivery endpoint whereby future mail items may be routed to that delivery endpoint in dependence on those data objects, wherein the portions of the address block to be made available to a particular analysis module are selected in dependence on the data types of the one or more data objects which that analysis module is configured to provide.

2. A method as claimed in claim 1, further comprising the step of selecting for addition to the data set associated with the said delivery endpoint one or more of the stored data objects that have a representation component that does not match any part of the data set associated with the delivery endpoint.

3. A method as claimed in claim 2, wherein in the said step of selecting, a representation component is determined not to match any part of the data set associated with the delivery endpoint if a textual comparison of the representation component with the address stored in the said data set yields no match.

4. A method as claimed in claim 2, wherein in the said step of selecting, a representation component is determined not to match any part of the data set associated with the delivery endpoint if a phonetic comparison of the representation component with the address yields no match.

5. A method as claimed in claim 1, wherein the step of identifying a delivery endpoint for the mail item comprises manually determining a delivery endpoint indicated by the address block for the mail item.

6. A method as claimed in claim 1, wherein the step of identifying a delivery endpoint for the mail item comprises passing the mail item to an automated system arranged to determine the delivery endpoint of mail items it receives.

7. A method as claimed in claim 1, wherein the step of adding at least some of the stored data objects to the data set associated with the delivery endpoint comprises writing the at least some of the stored data objects to a routing database and linking the data objects to the delivery endpoint.

8. A method as claimed in claim 1, further comprising the step of including in at least some of the data objects a value indicating a measure of the confidence with which the representation component of the data object belongs to the indicated data type.

9. A method as claimed in claim 8, further comprising the step of selecting the at least some of the stored data objects for addition to the data set associated with the delivery endpoint in dependence on the confidence values of the stored data objects.

10. A method as claimed in claim 1, further comprising the step of selecting a stored data object for addition to the data set associated with the delivery endpoint in dependence on the degree of correlation between the representation component of the data object and at least part of the address stored in the said data set.

11. A method as claimed in claim 10, wherein the degree of correlation is judged on the basis of at least one of textual and phonetic similarity of at least one word of the representation component of the data object and the address stored in the said data set.

12. A method as claimed in claim 1, further comprising the step of selecting a stored data object for addition to the data set associated with the delivery endpoint in dependence on the repeated occurrence of the representation component of the data object in the captured address blocks of one or more mail items which share said delivery endpoint, wherein the representation component does not occur in the address stored in the said data set.

13. A method as claimed in claim 1, further comprising, subsequent to the step of decomposing the available portion of the address block into one or more data objects at an analysis module, the steps of:

making available at least some of the one or more data objects for processing at one or more further analysis modules of the analysis engine;

at each further analysis module, generating one or more further data objects, each including a representation component representing at least part of an available data object and a data type identifier; and storing the further data objects with the said data objects with an indication of the mail item to which the objects relate.

14. A method as claimed in claim 13, wherein one or more of the further analysis modules perform phonetic analysis of the said data objects.

15. A method as claimed in claim 1, wherein the data type identifier of a data object indicates that the representation component of that data object is one of: a textual representation, a phonetic representation, a binary representation, and a representation of location.

16. A method as claimed in claim 1, wherein the data type identifier of a data object indicates that the representation component of that data object is at least one of:

a title, a first name, a surname, a house number, a house or building name, an address line, a locality, a city or town, a county, a country, and a postcode.

17. A method as claimed in claim 1, wherein the representation component of a data object includes at least one data element.

18. A method as claimed in claim 17, wherein each data element represents at least one of: a title, a first name, a surname, a house number, a house or building name, an address line, a locality, a city or town, a county, a country, and a postcode.

19. A method for routing mail items in a mail sorting system that includes means for capturing address information from a mail item in the form of an address block and an analysis engine comprising a plurality of analysis modules, the method comprising:

receiving the address block at the analysis engine and making available to each of a set of the analysis modules at least a portion of the address block;

at a first set of analysis modules, decomposing the available portions of the address block into a first set of data objects, each including a text representation component representing of at least part of the portion and a data type identifier;

at a second set of analysis modules, performing phonetic processing on one or more of the first set of data objects so as to produce a second set of data objects, each including a phonetic representation component of the text of the respective first data object and a data type identifier;

subsequent to identifying a delivery endpoint for the mail item, comparing the phonetic representations of one or more second data objects with the phonetic representations of one or more parts of the address stored in a data set associated with the delivery endpoint; and adding to the data set those second data objects whose phonetic representations at least approximately match the phonetic representations of the one or more parts of the address stored in the said data set, whereby future mail items may be routed to that delivery endpoint in dependence on those data objects.

20. A method as claimed in claim 19, further comprising the step of selecting for addition to the data set associated with the said delivery endpoint those second data objects having a representation component which on a textual comparison does not match any part of the address stored in the said data set.

21. A method as claimed in claim 19, wherein each phonetic representation is a numeric or alphanumeric code generated by a phonetic analysis module in dependence on the text representation component of the respective first data object.

22. A method as claimed in claim 19, wherein the comparing step includes comparing at least one alternative phonetic representation linked to the phonetic representations of a respective second data object with the phonetic representations of at least one part of the address stored in the said data set.

23. A mail sorting system for automatically routing mail items comprising:

means for capturing address information from a mail item in the form of an address block;

an analysis engine comprising a plurality of analysis modules:

the analysis engine being arranged to receive a captured address block and make at least a portion of the address block available to each of a set of the analysis modules;

each of the set of analysis modules being configured to decompose the available portion of the address block into one or more data objects, each including a representation component representing at least part of the portion and a data type identifier;

a data store arranged to store the data objects in a database with an indication of the mail item to which the objects relate;

means for receiving at the mail sorting system an indication of the delivery endpoint for the mail item; and means for adding at least some of the stored data objects to a data set associated with the delivery endpoint, whereby future mail items may be routed to that delivery endpoint in dependence on those stored data objects.

24. A mail sorting system for automatically routing mail items comprising:

means for capturing address information from a mail item in the form of an address block;

an analysis engine comprising a plurality of analysis modules:

the analysis engine being arranged to receive the address block and to make at least a portion of the address block available to each of a set of the analysis modules;

each of a first set of analysis modules being configured to decompose the available portions of the address block into a first set of data objects, each including a text representation component representing of at least part of the portion and a data type identifier;

each of a second set of analysis modules being configured to perform phonetic processing on one or more of the first set of data objects so as to produce a second set of data objects, each including a phonetic representation component of the text of the respective first data object and a data type identifier;

means for receiving at the mail sorting system an indication of the delivery endpoint for the mail item;

means for comparing the phonetic representations of one or more second data objects with the phonetic representations of one or more parts of the address stored in a data set associated with the delivery endpoint; and means for adding to the data set those second data objects whose phonetic representations at least approximately match the phonetic representations of the one or more parts of the address stored in the said data set, whereby future mail items may be routed to that delivery endpoint in dependence on those data objects.

\* \* \* \* \*